(12) United States Patent
Kim

(10) Patent No.: US 6,327,011 B2
(45) Date of Patent: *Dec. 4, 2001

(54) LIQUID CRYSTAL DISPLAY DEVICE HAVING THIN GLASS SUBSTRATE ON WHICH PROTECTIVE LAYER FORMED AND METHOD OF MAKING THE SAME

(75) Inventor: Woong Kwon Kim, Kyungki-do (KR)

(73) Assignee: LG Electronics, Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,124

(22) Filed: Oct. 20, 1997

(51) Int. Cl.$^7$ .................................................. G02F 1/1333
(52) U.S. Cl. ................................. 349/122; 349/158
(58) Field of Search .................................. 349/158, 122, 349/96

(56) References Cited

U.S. PATENT DOCUMENTS

| | | | |
|---|---|---|---|
| 3,869,313 | 3/1975 | Jones et al. | 134/73 |
| 4,125,594 | 11/1978 | Su et al. | 423/488 |
| 4,147,581 | 4/1979 | Nelson | 156/345 |
| 4,332,649 | 6/1982 | Sälzle | 204/98 |
| 4,341,841 * | 7/1982 | Ohno et al. | 349/122 |
| 4,482,425 | 11/1984 | Battey | 156/637 |
| 4,715,686 * | 12/1987 | Iwashita et al. | 350/339 |
| 4,826,556 | 5/1989 | Kobayashi | 156/345 |
| 4,886,590 | 12/1989 | Tittle | 204/232 |
| 4,953,952 * | 9/1990 | Okumura et al. | 349/122 |
| 4,980,017 | 12/1990 | Kaji et al. | 156/642 |
| 5,000,795 | 3/1991 | Chung et al. | 134/37 |
| 5,082,518 | 1/1992 | Molinaro | 156/345 |
| 5,112,453 | 5/1992 | Behr et al. | 204/129 |
| 5,251,980 | 10/1993 | Hiraoka et al. | 374/7 |
| 5,277,715 | 1/1994 | Cathey | 134/2 |
| 5,319,479 * | 6/1994 | Yamada et al. | 349/122 |
| 5,371,619 * | 12/1994 | Sirkin et al. | 349/122 |
| 5,513,024 * | 4/1996 | Kang | 359/62 |
| 5,514,850 * | 5/1996 | Miyazaki et al. | 219/121.69 |
| 5,540,784 | 7/1996 | Ranes | 134/10 |
| 5,606,438 * | 2/1997 | Margalit et al. | 349/60 |
| 5,654,057 | 8/1997 | Kitayama et al. | 428/64.1 |
| 5,701,165 * | 12/1997 | Kubo et al. | 349/137 |
| 5,715,022 * | 2/1998 | Takamatsu et al. | 349/95 |
| 5,766,493 * | 6/1998 | Shin | 216/23 |
| 5,767,931 * | 6/1998 | Paczkowski | 349/158 |
| 5,781,255 * | 7/1998 | Yamamoto et al. | 349/43 |
| 5,784,137 * | 7/1998 | Shiomi et al. | 349/88 |
| 5,788,871 | 8/1998 | Huh | 216/84 |
| 5,808,715 * | 9/1998 | Tsai et al. | 349/122 |
| 5,818,559 * | 10/1998 | Yoshida | 349/122 |
| 5,819,434 | 10/1998 | Herchen et al. | 34/232 |
| 5,990,992 * | 11/1999 | Hamanaka et al. | 349/95 |

FOREIGN PATENT DOCUMENTS

| | | |
|---|---|---|
| 1920 009 | 10/1970 | (DE) . |
| 3611387A1 | 10/1987 | (DE) . |
| 3853904T2 | 3/1989 | (DE) . |
| 1200180 | 12/1959 | (FR) . |
| 829605 | 3/1960 | (GB) . |
| 60-163435 | 8/1985 | (JP) . |

OTHER PUBLICATIONS

Von Bernd Hartmann, *Neue Recyclingtechniken und Abwasserbehandlungsmethoden*, Technische Rundschau, 37/90, 1990 pp. 104–109.

* cited by examiner

*Primary Examiner*—William L. Sikes
*Assistant Examiner*—Dung Nguyen
(74) *Attorney, Agent, or Firm*—Morgan, Lewis & Bockius LLP

(57) ABSTRACT

The LCD according to present invention includes a first substrate and a second substrate, two protective layers including at least one layer formed on outer surface of the first and second substrates, a transparent electrode formed on inner surface of the first substrate or the second substrate, an alignment layer formed on the transparent electrode, and two polarizers attached on the first and second substrates.

25 Claims, 3 Drawing Sheets

FIG · 1a
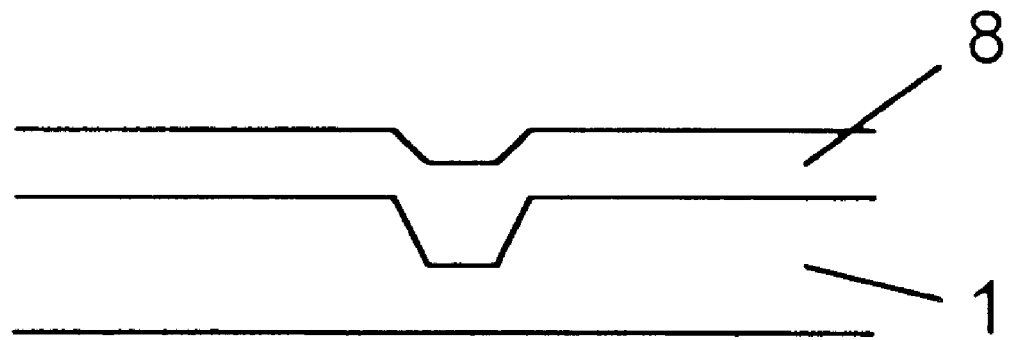
FIG · 1b
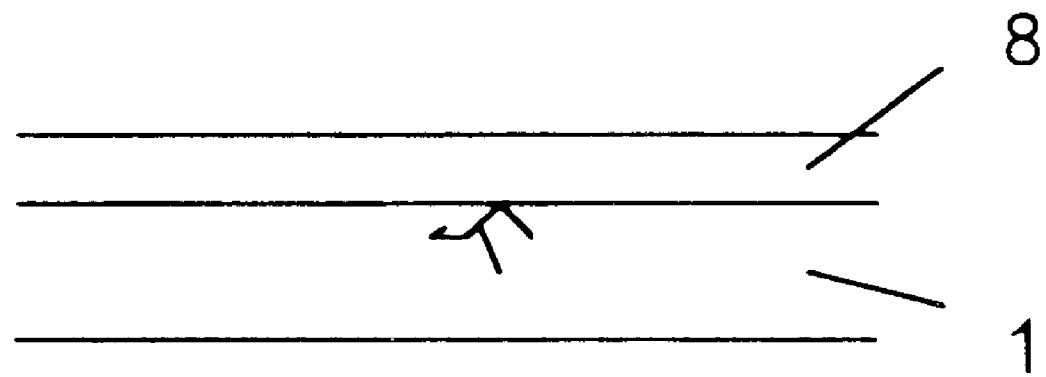

LIQUID CRYSTAL DISPLAY DEVICE HAVING THIN GLASS SUBSTRATE ON WHICH PROTECTIVE LAYER FORMED AND METHOD OF MAKING THE SAME

BACKGROUND OF THE INVENTION

The present invention relates to a liquid crystal display device, and more particularly to a liquid crystal display device having glass substrates uniformly and smoothly formed on its outer surface to increase the mechanical strength thereof and method of making the same.

As a display device of a television and a personal computer, etc., a large size cathode ray tube(CRT) display device has been used. However, since the screen must be separated from the electron gun more than predetermined distance for large size screen CRT, the volume is increased. Thus, this CRT cannot be applied to the thin weight, small size, and low power consumption electronic device such as a wall-mounted television, a portable television and a notebook computer, etc.

According to the purpose of display device, the flat panel display devices such as LCD(liquid crystal display), PDP (plasma display panel), ELD(electroluminescent display), and VFD(vacuum fluorescent display) have been introduced recently. Among above flat panel display device, the LCD has been dominantly researched for the good picture quality and low power consumption. The LCD-applied portable television and notebook computer are on the market resent, but there are also problems to be solved in this LCD yet. Particularly, the size and weight are important factor of the LCD investigation because of the apparatus have to be in hands of user.

For small size and light LCD, there are several methods of reducing the size and weight of the LCD element. However, the driving circuit and the thin film transistor, which are necessary element of the LCD, are so thin that the weight cannot be reduced. On the other hand, it is possible to reduce the weight of the glass substrate which is a basic element of the LCD. Specially, since the glass substrate is most heavy element of the LCD, the method of reducing the weight of the glass substrate has been continuously researched.

The light glass substrate means thin glass substrate. However, the thin glass substrate causes the damage and the surface roughness, so that the mechanical strength is weakened and the image quality of LCD is deteriorated.

In several etching methods of reducing the thickness of the glass substrate, it is representative that the substrate is etched in a case which was filled with etchant. In this etching method, however, because of impurities created in etching process, the substrate is not uniformly etched.

Therefore in proposed another etching method, the substrate is etched removing the impurities created in etching process by bubbles through a porous plate after a substrate is arranged.

In this method, however, bubbles appear on the substrate, or cracks occur by mechanical impulse, the bubbles were created in process of manufacturing glass and diameters of several um—several ten um. In case that the substrate applied to a LCD desirable image quality can not be achieved because of scattering of the light in a bubble region. Further if the cracks occur on the substrate by an etching process of the glass or mechanical impulse, impurities pass into the substrate in manufacturing process of the LCD thereby a quality of the LCD is down. In addition, since the crack is intensified according to passing of time, thereby the substrate is brokendown.

Accordingly in order to decrease weight of the LCD by etching the substrate, it is very important to decrease a fault on the substrate as well as an etching method.

SUMMARY OF THE INVENTION

An object of the present invention is to provide the LCD having thin glass substrate which is light and its surface is smooth and strong from mechanical impulse.

In order to achieve this object, the LCD according to present invention includes a first substrate and a second substrate, two protective layers including at least one layer formed on outer surface of the first and second substrates, a transparent electrode formed on inner surface of the first substrate or the second substrate, an alignment layer formed on the transparent electrode, and two polarizers attached on the first and second substrates.

Each the protective layer material may be an inorganic matter having a compressive stress or an organic matter having a low viscosity coefficient, further the protective layer may be one layer including an inorganic layer or an organic layer, or a plurality of layers composed of same matter or different matter. The inorganic layer is formed by a thin layer depositing method on the substrate, while the organic layer is formed by irradiating the light such as ultraviolet, visible ray, etc., onto a thermosetting resin deposited on the substrate and curing that.

BRIEF DESCRIPTION OF THE DRAWINGS

FIGS. 1a, b are drawings showing a glass substrate having a protective layer in accordance with present invention, FIG. 1a represents a protective layer on which bubbles appear, FIG. 1b represents a protective layer on which cracks occur.

DETAILED DESCRIPTION OF THE INVENTION

Reference will now be made in detail to the present preferred embodiments of the invention, examples of which are illustrated in the accompanying drawings.

FIGS. 1a, b are drawings showing a glass substrate 1 having the protective layer, as shown in FIG. 1a, a bubble, which is formed in process of manufacturing glass and its diameter is several um—several ten um, is appeared on the thin substrate which is etched less than 0.7 mm. Further, since the thickness of the glass substrate 1 is very thin, a crack may be occured by fine mechanical impulse as shown in FIG. 1b.

A transparent protective layer 8 formed on the substrate 1 includes a plurality of layer having an inorganic matter or an organic matter, or an inorganic matter and an organic matter, then a refractive index of each layer is 1.4–1.6. the inorganic layer 8 is formed on the substrate 1 by general thin layer deposition method such as sputtering method, CVD (chemical vapor deposition) method, and evaporation method. While organic layer 8 is formed by irradiating the light such as ultraviolet, visible ray, etc., onto a thermosetting resin deposited on the substrate and curing that. At this time the inorganic matter having the compressive stress and the organic matter having the low viscosity coefficient(about several cp—several ten cp).

When bubbles appear on the surface of substrate 1 as shown in FIG. 1a, an desirable image quality can not be achived because of scattering of the light in a bubble region.

Since the protective layer 8 is formed on the bubble as well as the surface of substrate 1, diameters of the bubbles are minimized from micrometer to angstrom. Accordingly when the substrate 1 is applied to a LCD, it is possible to prevent decreasing of an image quality by small scattering of the light in that region.

Additionally if cracks occur on the substrate 1 as shown in FIG.1b, the substrate 1 is brokendown slowly according to passing of time in manufacturing process of the LCD. Further an impurity inserted in the crack cause to decrease quality of the LCD. While the inorganic layer prevent transmission of the crack by the compressive stress, and the cured organic layer also prevent transmission of the crack, thereby a strong glass substrate for mechanical impulse can be achieved.

The protective layer 8 may be one layer with an inorganic layer or an organic layer, or a plurality of layers composed of same matter or different matter.

Figure 2:
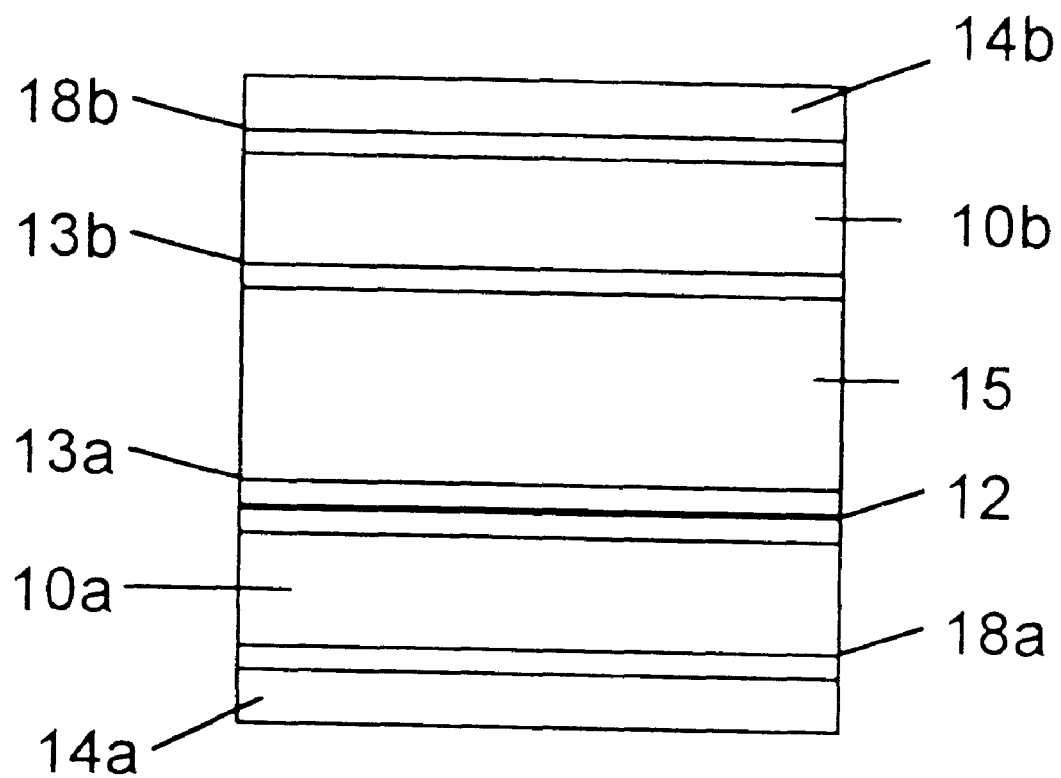
FIG. 2 is a drawing showing a liquid crystal display device having the glass substrate of the FIGS. 1a, b.

FIG. 2 is a drawing showing a liquid crystal display device having two glass substrates including the protective layers.

Figure 3:
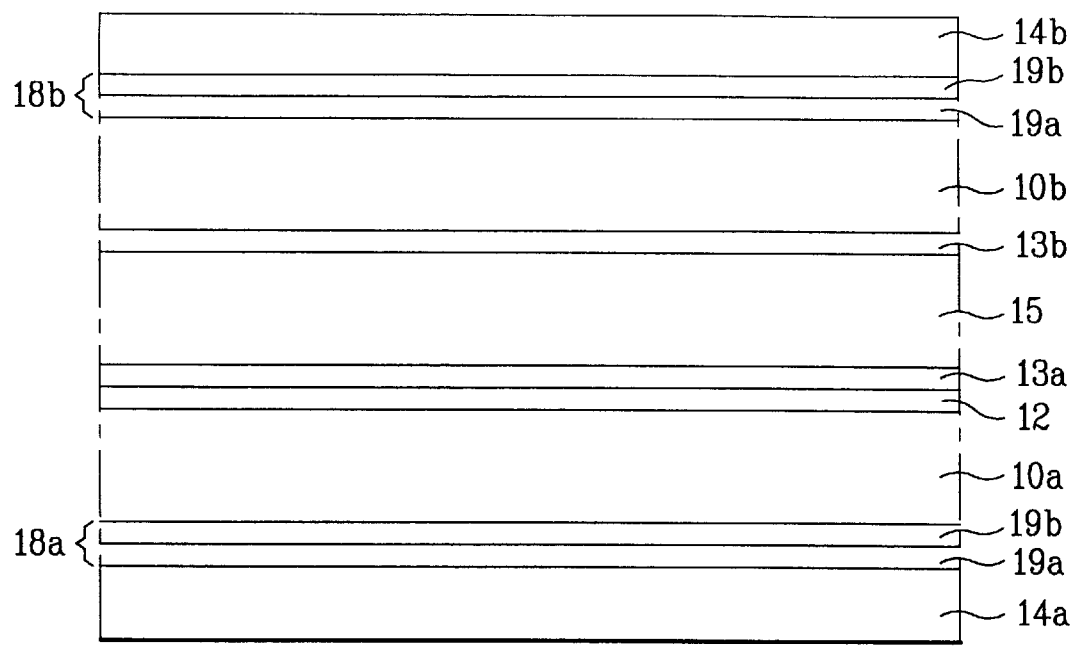
FIG. 3 is a drawing showing a liquid crystal display device having a plurality of layers wherein layers 18a and 18b are composed of an inorganic layer 19a and an inorganic layer 19b.
Figure 4:
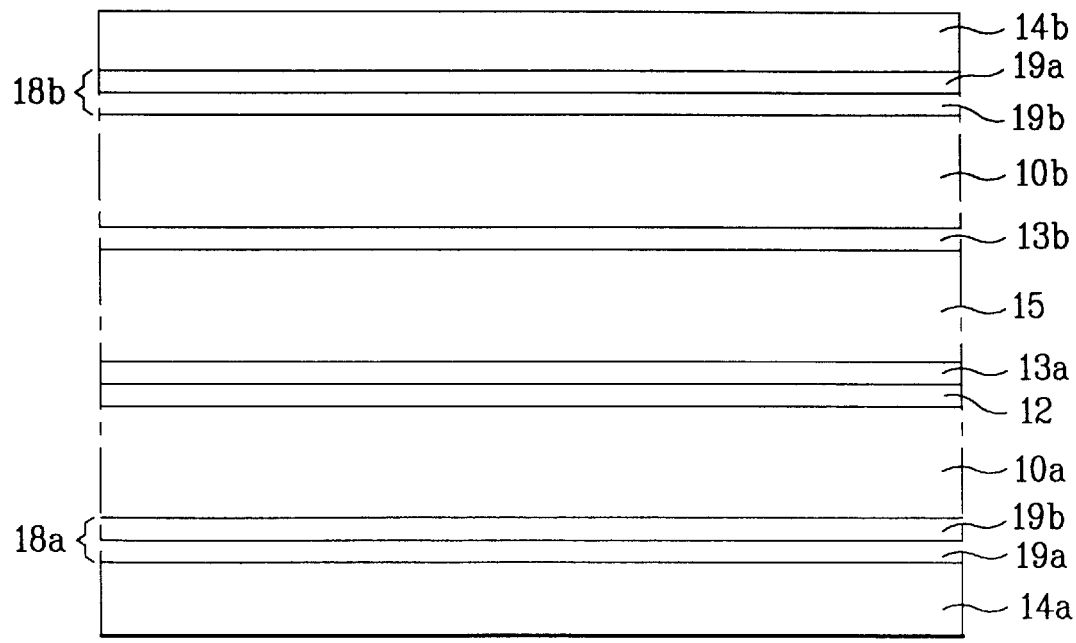
FIG. 4 is a drawing showing a liquid crystal display device having a plurality of layers wherein layers 18a and 18b are composed of an inorganic layer 19a and an inorganic layer 19b in a different arrangement than FIG. 3.

Each thickness of a first substrate 10a and a second substrate 10b is less than 0.7 mm, a transparent electrode 12 made of such as ITO (indium tin oxide) is formed on the first substrate. In present embodiment, although, the transparent electrode 12 is formed on the first substrate, it is possible that the transparent electrode 12 is formed on the second substrate. Further alignment layers 13a, 13b including polyamide or photo alignment material are formed on the transparent electrode 12, then an alignment direction of the alignment layer is detennined by using a mechanical or optical method. On the other hand a liquid crystal layer 15 is formed between the first and second substrates. The protective layer 18a, 18b are an inorganic layers 19a or an organic layers 19b, or a plurality of layers composed of same matter (e.g., 19a and 19a) or different matter (e.g., 19b and 19a) and formed on outside surface of both the first substrate 10a and the second substrate 10b. Continually a first polarizer 14a and a second polarizer 14b are formed on the protective layers 18a, 18b. See FIGS 3 and 4.

Although not showing with drawing, TFTs(thin film transisters) are formed on the first substrate 10a, and a color filter layer is formed on the second substrate.

After etching, grinding and scribing two glasses by general etching method, the protective layers 18a, 18b are formed on that, and the transparent electrode 12 is formed on the protective layer 18a, 18b by the sputtering method. Alternatively, also it is possible to process (etch, grond, and seribing, etc) the substrate 10a, 10b after the passivation layers 18a, 18b are formed on each the glass. Further the TFTs(not illustrated) are formed on the first substrate 10a by depositing and photoetching a metal layer, and the alignment layer 13a, 13b are formed by mechanical depositing or injecting the alignment material. Thereafter a plurality of spacers(not illustrated) are dispersed to maintain a gap between the first and second substrate 10a, 10b. After pouring the liquid crystal into a region between the first and second substrates and the two substrates are sealed, and thereby the LCD according to the present invention is completed.

In the above-discussed structure, since the protective layer includes an inorganic or an organic matter, the thin glass substrate through etching is bearable from a mechanical impulse.

Further in etching process, since the inorganic or organic matter have diameters of the bubbles which a quality of the LCD is down by that decreased, it is possible to achieve the good quality LCD having soft and uniform surface.

When cracks occur on the substrate, the protective layer prevent transmission of the crack thereby the substrate is not brokendown.

As a result, the present invention provides the good quality LCD having thin glass substrate light and its surface is smooth and strong from mechanical impulse.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A thin glass substrate of a liquid crystal display device, comprising:

a glass substrate having a transparent electrode on its upper surface and configured to be coupled with another substrate to enclose a liquid crystal, the glass substrate having a chemically etched back surface; and at least one transparent protective layer on the back surface of the glass substrate to reinforce the glass substrate for preventing cracks which occur due to an external impact, the at least one transparent protective layer including an inorganic layer and an organic layer, the organic layer having a thermosetting resin and a viscosity coefficient of the thermosetting resin being several cp to several ten cp.

2. The thin glass substrate according to claim 1, wherein a refractive index of the transparent protective layer is 1.4–1.6.

3. A thin glass substrate according to claim 1, wherein a thickness of the glass substrate is less than about 0.7 mm.

4. A liquid crystal display device, comprising:

a first glass substrate and a second glass substrate coupled with the first glass substrate, at least one of the first and second glass substrates having a chemically etched outer surface;

a transparent protective layer on the chemically etched outer surface, the transparent protective layer reinforcing the at least one of the first and second glass substrates to prevent cracks which may occur due to an external impact, the transparent protective layer including an inorganic layer and an organic layer, the organic layer having a thermosetting resin and a viscosity coefficient of the thermosetting resin being several cp to several ten cp;

a transparent electrode on an inner surface of each of the first glass substrate and the second glass substrate;

an alignment layer on each transparent electrode; and a liquid crystal layer between the first glass substrate and the second glass substrate.

5. The liquid crystal display device according to claim 4 wherein a refractive index of the transparent protective layer is 1.4–1.6.

6. The liquid crystal display device according to claim 4 wherei n the at least one of the first and second substrates that has the transparent protective layer thereon has a thickness of less than about 0.7 mm.

7. A liquid crystal display device, comprising:
a first glass substrate and a second glass substrate coupled with the first glass substrate, at least one of the first and second glass substrates having a chemically etched surface;
a transparent protective layer formed on an outer surface of at least one of the first and second glass substrates, the transparent protective layer reinforcing at least one of the first and second glass substrates to prevent cracks which occur due to an external impact, the transparent protective layer including an inorganic layer and an organic layer, the organic layer having a thermosetting resin and a viscosity coefficient of the thermosetting resin being several cp to several ten cp;
a transparent electrode on an inner surface of each of the first glass substrate and the second glass substrate;
an alignment layer formed on each transparent electrode; and
a liquid crystal layer between the first glass substrate and the second glass substrate.

8. The device according to claim 7, further comprising a polarizer formed on the transparent protective layer.

9. A thin glass substrate of a liquid crystal display device, comprising:
a glass substrate having a transparent electrode on its upper surface and having a chemically etched back surface; and
a transparent protective layer on the back surface of the glass substrate, the transparent protective layer including an inorganic layer and an organic layer, the organic layer having a thermosetting resin and a viscosity coefficient of the thermosetting resin being several cp to several ten cp.

10. A method of manufacturing a thin glass substrate of a liquid crystal display device, comprising the steps of:
providing a glass substrate;
processing the glass substrate to reduce the weight of the glass substrate, including chemically etching a back surface of the glass substrate; and
forming a protective layer on the back surface of the glass substrate, the protective layer reinforcing the glass substrate to prevent cracks which may occur due to an external impact, the protective layer including an inorganic layer and an organic layer, the organic layer having a thermosetting resin and a viscosity coefficient of the thermosetting resin being several cp to several ten cp.

11. The method according to claim 10, wherein the step of processing includes steps of:
grinding a glass; and
scribing the glass substrate.

12. The method according to claim 10, wherein the step of processing the glass substrate is executed after forming the protective layer.

13. The method according to claim 10, wherein the step of processing includes the step of thinning the glass substrate by etching.

14. The method according to claim 10, wherein the step of forming the protective layer further includes steps of:
forming the organic layer by light irradiation after depositing an organic matter on the glass substrate; and
forming the inorganic layer by coating an inorganic matter on the organic layer.

15. The method according to claim 14, wherein the light is an ultraviolet or a visible ray.

16. The method according to claim 10, wherein the step of forming the protective layer further includes steps of:
forming the inorganic layer by coating an inorganic matter on the glass substrate; and
forming the organic layer by light irradiation after depositing an organic matter on the inorganic layer.

17. The method according to claim 16, wherein the light is an ultraviolet or a visible ray.

18. The method according to claim 10, wherein the step of processing the glass substrate includes thinning the glass substrate to a thickness of less than about 0.7 mm.

19. A method of manufacturing a liquid crystal display device, comprising the steps of:
providing a first glass substrate and a second glass substrate;
forming a transparent electrode on an inner surface of each of the first glass substrate and the second glass substrate;
forming an alignment layer on each transparent electrode;
assembling the first and second glass substrates;
forming a liquid crystal layer between the first glass substrate and the second glass substrate;
processing at least one of the first and second glass substrates to reduce the weight of the glass substrate; and
forming a transparent protective layer on an outer surface of at least one of the first glass substrate and the second glass substrate, the transparent protective layer reinforcing the at least one of the first and second glass substrates to prevent cracks which occur due to an external impact, the transparent protective layer including an inorganic layer and an organic layer, the organic layer having a thermosetting resin and a viscosity coefficient of the thermosetting resin being several cp to several ten cp.

20. The method according to claim 19, wherein the at least one of the first and second substrates that has the transparent protective layer thereon has a thickness of less than about 0.7 mm.

21. A method of manufacturing a liquid crystal display device, comprising the steps of:
providing a glass;
forming a glass substrate having a chemically etched surface by processing the surface of the glass; and
forming a transparent protective layer on the processed surface of the glass substrate, the transparent protective layer including an organic layer and an inorganic layer, the organic layer having a thermosetting resin and a viscosity coefficient of the thermosetting resin being several cp to several ten cp.

22. The method according to claim 21, wherein the step of forming the transparent protective layer includes the steps of:
forming the inorganic layer by coating an inorganic matter on the glass substrate; and
forming the organic layer by light irradiation after depositing an organic matter on the inorganic layer.

23. The method according to claim 22, wherein the light irradiation in the step of forming the organic layer includes an ultraviolet or a visible ray.

24. The method according to claims 21, wherein the step of forming the transparent protective layer includes the steps of:
forming the organic layer by light irradiation after depositing an organic matter on the glass substrate; and
forming the inorganic layer by coating an inorganic matter on the organic layer.

25. The method according to claim 24, wherein the light irradiation in the step of forming the organic layer includes an ultraviolet or a visible ray.

* * * * *